United States Patent [19]

Beissbarth

[11] Patent Number: 4,481,716
[45] Date of Patent: Nov. 13, 1984

[54] WHEEL ALIGNMENT MEASURING APPARATUS

[76] Inventor: Osmond Beissbarth, Sulzbacher Strasse 15, 8000 München 40, Fed. Rep. of Germany

[21] Appl. No.: 468,293

[22] Filed: Feb. 22, 1983

[30] Foreign Application Priority Data

Feb. 24, 1982 [DE] Fed. Rep. of Germany ....... 3206646

[51] Int. Cl.³ .................. G01B 5/255; G01B 7/315
[52] U.S. Cl. .................................... 33/203.18; 33/288
[58] Field of Search ........... 33/288, 181 AT, 180 AT, 33/203, 203.15, 203.18

[56] References Cited

U.S. PATENT DOCUMENTS

| | | | |
|---|---|---|---|
| 3,164,910 | 1/1965 | Manlove | 33/203.18 |
| 3,181,298 | 5/1965 | Manlove | 33/203 X |
| 4,236,315 | 12/1980 | Curchod et al. | 33/203.18 |
| 4,319,838 | 3/1982 | Grossman et al. | 33/288 X |
| 4,341,021 | 7/1982 | Beissbarth | 33/288 X |

*Primary Examiner*—Harry N. Haroian
*Attorney, Agent, or Firm*—Birch, Stewart, Kolasch & Birch

[57] ABSTRACT

A wheel alignment measuring apparatus including four angle measuring instruments for mounting on front wheels and rear wheels of a vehicle, and including a calculation circuit for the determination of track measuring values. A measuring bridge is operatively provided essentially transversely to the driving direction and is positioned approximately between the front wheels and the rear wheels. Four additional angle measuring instruments are provided, two being operatively arranged on one side and two being operatively arranged on the other side of the measuring bridge. An elastic tension member is operatively connected between the four angle measuring instruments and the four additional angle measuring instruments for measuring the angle positions of the wheels. The calculation circuit determines the track measuring values from comparing angular positions of all angle measuring instruments. The angle measuring instruments are arranged and connected so that influences resulting from the track of the vehicle wheels and the width of the measuring bridge as well as differences in the distance between the measuring bridge and the front wheels or the rear wheels are not reflected by the result of the measurement.

19 Claims, 17 Drawing Figures

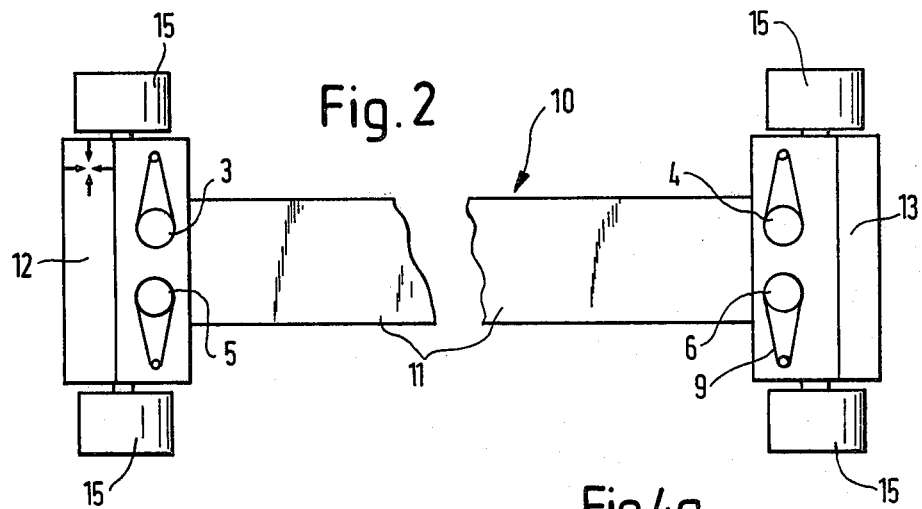
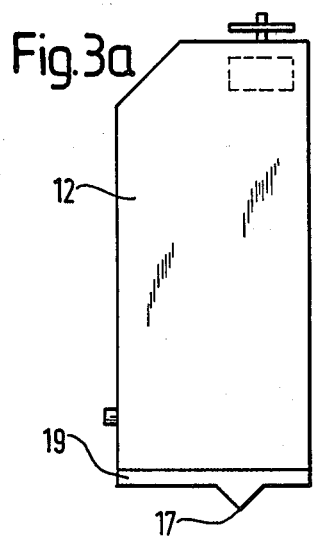
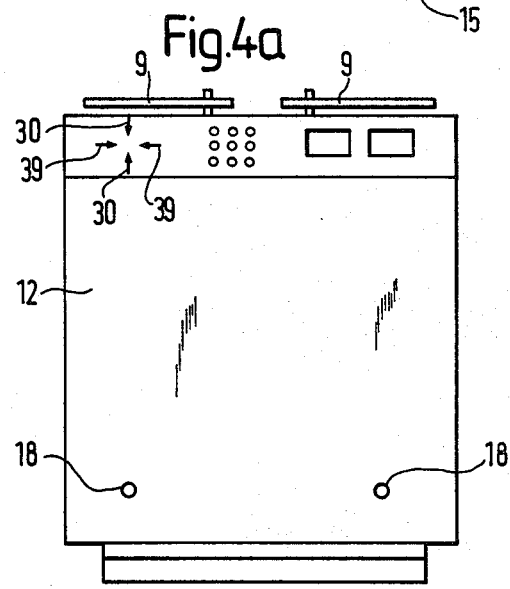
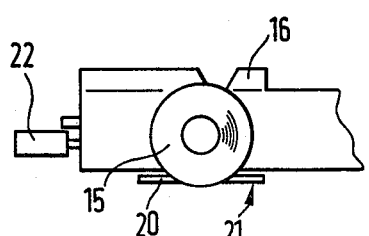
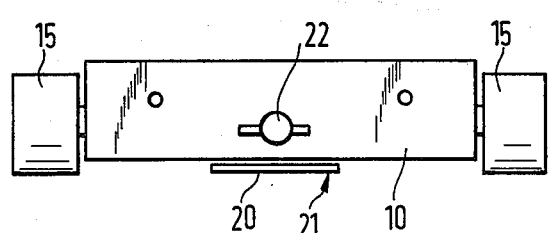

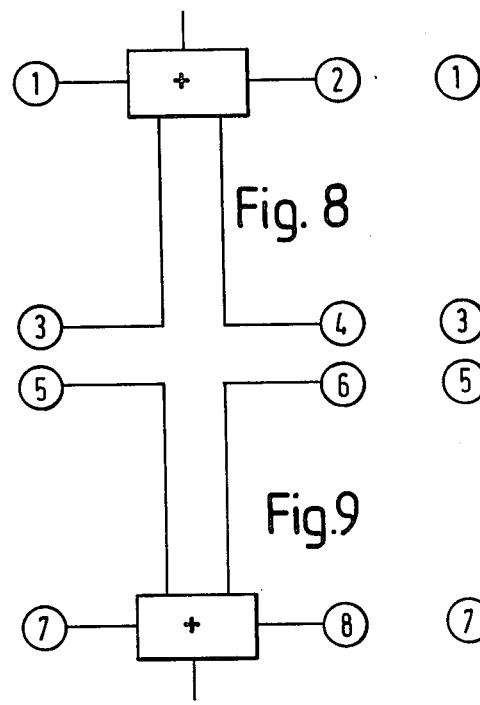
Fig. 8
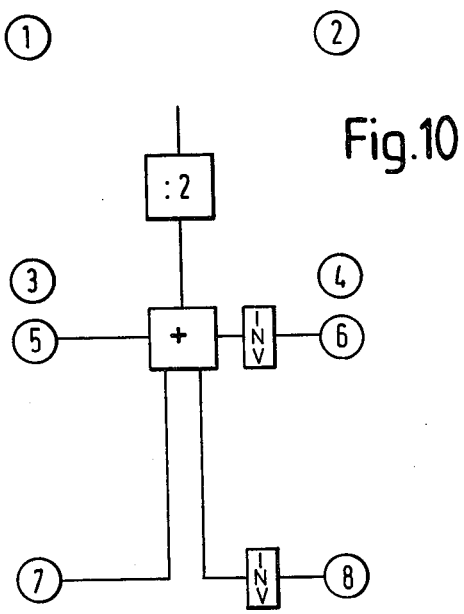
Fig. 10
Fig. 9
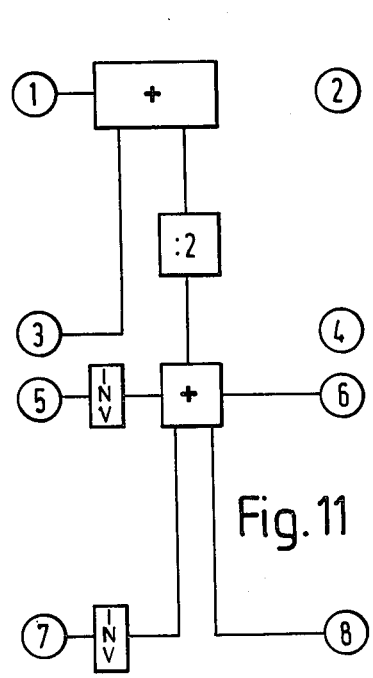
Fig. 11
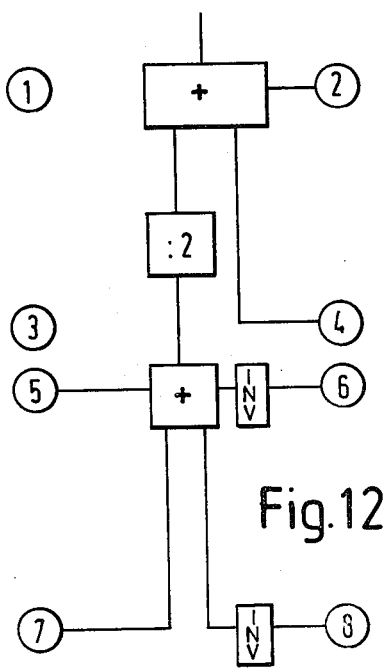
Fig. 12

Fig. 13
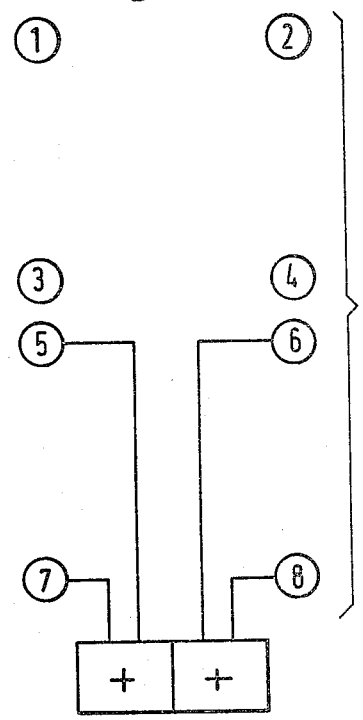
Fig. 14
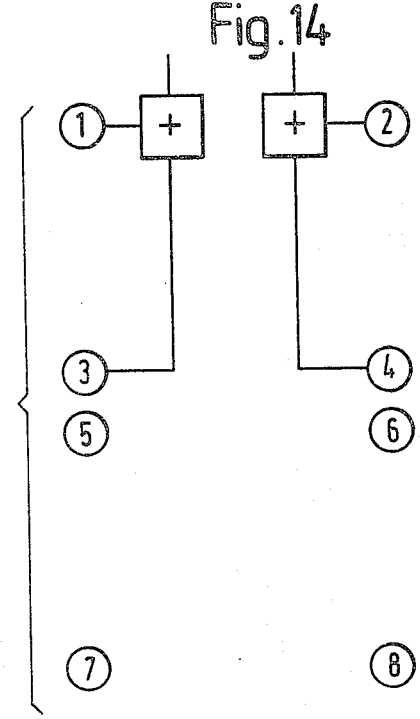
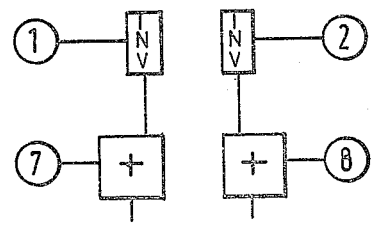
Fig. 15

WHEEL ALIGNMENT MEASURING APPARATUS

BACKGROUND AND SUMMARY OF THE INVENTION

The present invention relates to a wheel alignment measuring apparatus in accordance with the generic part of claim 1.

For a long time it has been common practice in the vehicle industry to measure and adjust the individual track of the front wheels relative to the geometrical driving axis.

It is well known that the geometrical driving axis is defined as the bisecting line from the total track of the rear axle and equals the imaginary line analogously formed from the angular position of the two rear wheels in the longitudinal direction of the vehicle. A toe-in "0" means a position where the wheel axle of one of the front wheels is at right angles to the geometrical driving axis.

In particular wheel alignment measuring apparatuses for trucks and buses should also be able to measure the above parameters with a high precision and, in addition to that, should be easily operable. In the case of buses this is caused by the high safety requirements with respect to the passengers, which should therefore particularly take into account the high speeds driven on motorways.

Furthermore, in the case of trucks provided with two steerable front axles the correspondence of the positions of all wheels with respect to each other is of special importance. Otherwise, in the case of an almost identical load acting on the wheels an inexact adjustment of the wheels with respect to each other would result in an unusually high wear of the tires. In view of the costs of such a set of tires a high mileage is particularly desirable in the case of trucks.

The technical preconditions for the measurements of the wheel alignment in the case of trucks and buses are, due to their weight and dimensions, different from those in motorcars, and therefore require a different system and a different design of the wheel alignment measuring apparatus.

Thus, a known method according to which a vehicle is placed in a given optical rectangle firmly connected with the underlying ground requires a considerable amount of space in the case of buses. In practice, the necessary alignment movement of the vehicle within the given rectangle requires an enormous amount of work due to the weight of the vehicles.

Methods using light rays for the determination of the wheel alignment are problematic due to the low wheel base. With increasing distance the light rays lose their luminous power, the light spots increase and in order to be able to read the values the operator will often have to change the place and the side. Due to legal provisions it is forbidden to replace the light rays by laser rays.

In another known measuring method units provided with arms are mounted at the front wheels, said arms being parallel to the front wheels and provided with rotary potentiometers at their ends. The tension arms of the rotary potentiometers are connected with each other by means of elastic elements and thus help to determine the angular position of the tension arms with respect to each other. This measuring method, which has proved quite successful in the measurement of motorcars, is difficult to apply in the case of buses and trucks. The difficulties result from the length and depth of the front parts of the buses. Measured from the middle of the axle of the front wheels the length of the front part is 2 to 3 m. The arms supporting the angle pick-ups in this measuring method abut the front part during a swivel movement of the wheels which is necessary for the measurement of the caster and the toe-in and is 20° on each side. Further difficulties arise from the length of the distance between the front wheels and the rear wheels since at this length tension elements tend to vibrate.

It is thus an object of the invention to create a wheel alignment measuring apparatus particularly suited for trucks or buses, which can function without units mounted at the front wheels and provided with arms, is thus extremely space-saving and, moreover, provides very accurate results and can, at the same time, be easily handled.

This object of the invention is solved in a wheel alignment measuring apparatus in accordance with the present invention.

The present invention can also be advantageously applied in trucks with two steered front axles since the position of the four front wheels is measured at the same time from a base, which so far has not been considered to be possible. The invention is of course not restricted to trucks or buses. It can rather be very successfully used in motorcars as well.

BRIEF DESCRIPTION OF THE DRAWINGS

Embodiments of the invention are now illustrated by means of the attached drawings, wherein FIG. 2 is a top view of the measuring bridge of the wheel alignment measuring apparatus, FIGS. 3A and 3B are side views of a measuring head of the measuring bridge and an end of the measuring bridge, FIGS. 4A and 4B are a front view of the measuring head of FIG. 3A and a front view of the measuring bridge, FIGS. 8 to 15 are schematic diagrams in order to illustrate the individual calculations.

DETAILED DESCRIPTION OF THE INVENTION

Figure 1:
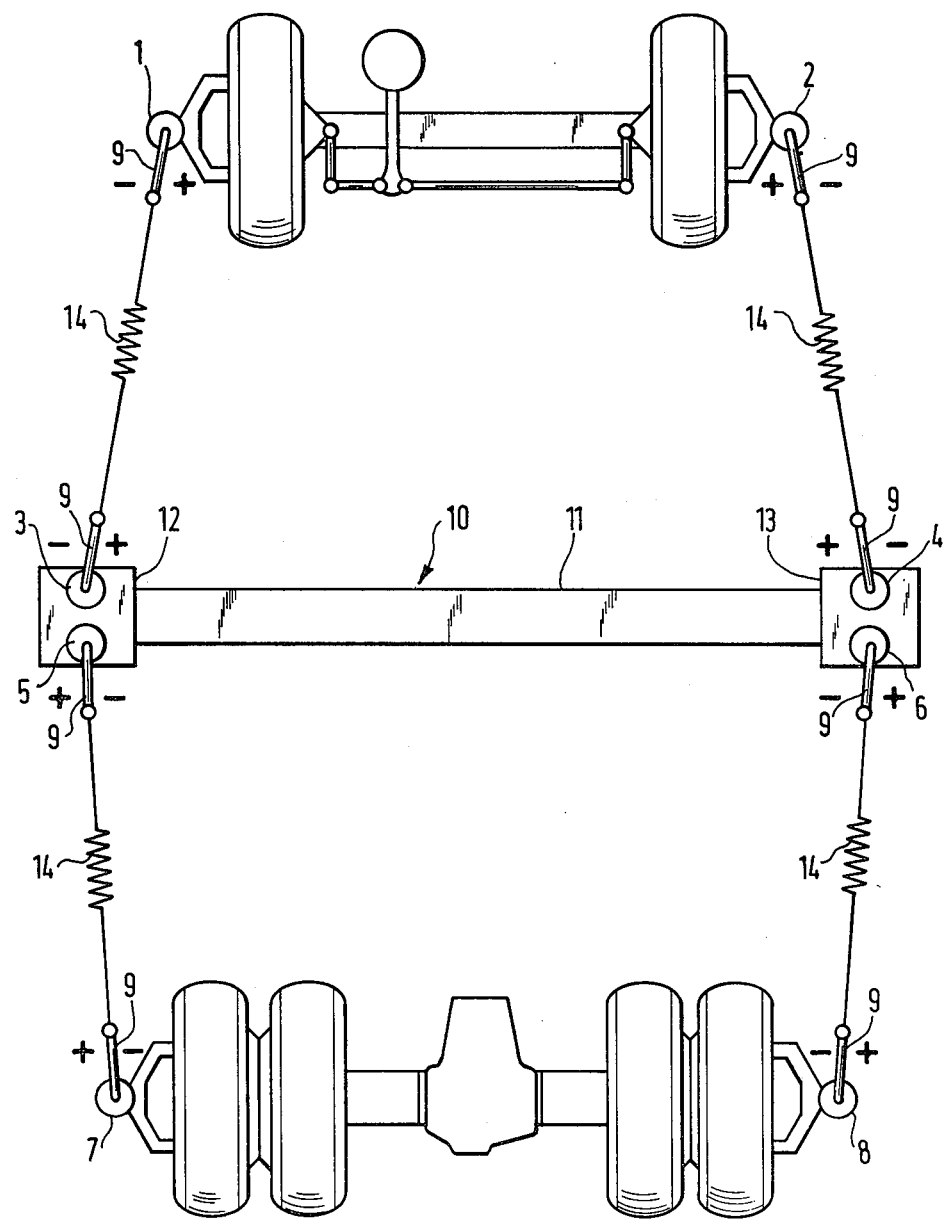
FIG. 1 is a top view of the wheel alignment measuring apparatus with four wheels of a vehicle.

The wheel alignment measuring apparatus substantially consists of a measuring bridge 10 with measuring heads 12, 13, angle pick-ups 3 to 6 on the measuring heads, angle pick-ups 1, 2, 7 and 8 at the front and rear wheels of a vehicle and tension elements 14 which connect the angle pick-ups facing each other.

For measuring purposes the measuring bridge 10 is moved under a vehicle at about the middle between the front and rear wheels. The measuring heads 12 and 13 are mounted on both sides on the measuring bridge 10, with two angle pick-ups 3 to 6 with tension arms 9 being built into said measuring heads. The four angle pick-ups 3 to 6 are arranged in such a way that in each of the two measuring heads 12 and 13 the direction of action of the first angle pick-up 3 and 4 is directed to the front and the direction of action of the second angle pick-up 5 and 6 is directed to the rear.

If the tension arms 9 of the angle pick-ups 3 to 6 are at right angles to the measuring bridge 10 they release an output signal "0".

The angle pick-ups 1, 2 and 7, 8 are attached at the front and rear wheels by means of the usual clamping devices. The direction of action of these angle pick-ups 1, 2 and 7,8 is towards the measuring bridge 10; they release an output signal "Zero" when their tension arms 9 are at right angles to the axis of rotation of the vehicle wheels.

The tension arms 9 to the angle pick-ups 3 to 6 of the measuring bridge 10 are connected with the tension arms 9 of the angle pick-ups 1, 2 and 7, 8 at the vehicle wheels by means of elastic tension elements 14. The angle pick-ups 1 and 3, 2 and 4, 5 and 7 and 6 and 8 are facing each other and influence each other.

Due to their polarity the angle indicators 1 to 8 facing each other influence each other in the opposite sense. A lateral displacement of the angle pick-up 3 of the measuring bridge 10 opposite the angle pick-up 1 mounted at the left front wheel results, for example, in a change with a positive sign of the same magnitude in both angle pick-ups 1 and 3. In other workds, the width of the measuring bridge is independent of the track of the vehicle.

The measuring bridge 10 must be exactly at right angles to the axis of symmetry of the vehicle. The accuracy of the measurement is additionally increased if both measuring heads 12 and 13 are at equal distances of the axis of symmetry of the vehicle.

Figure 5:
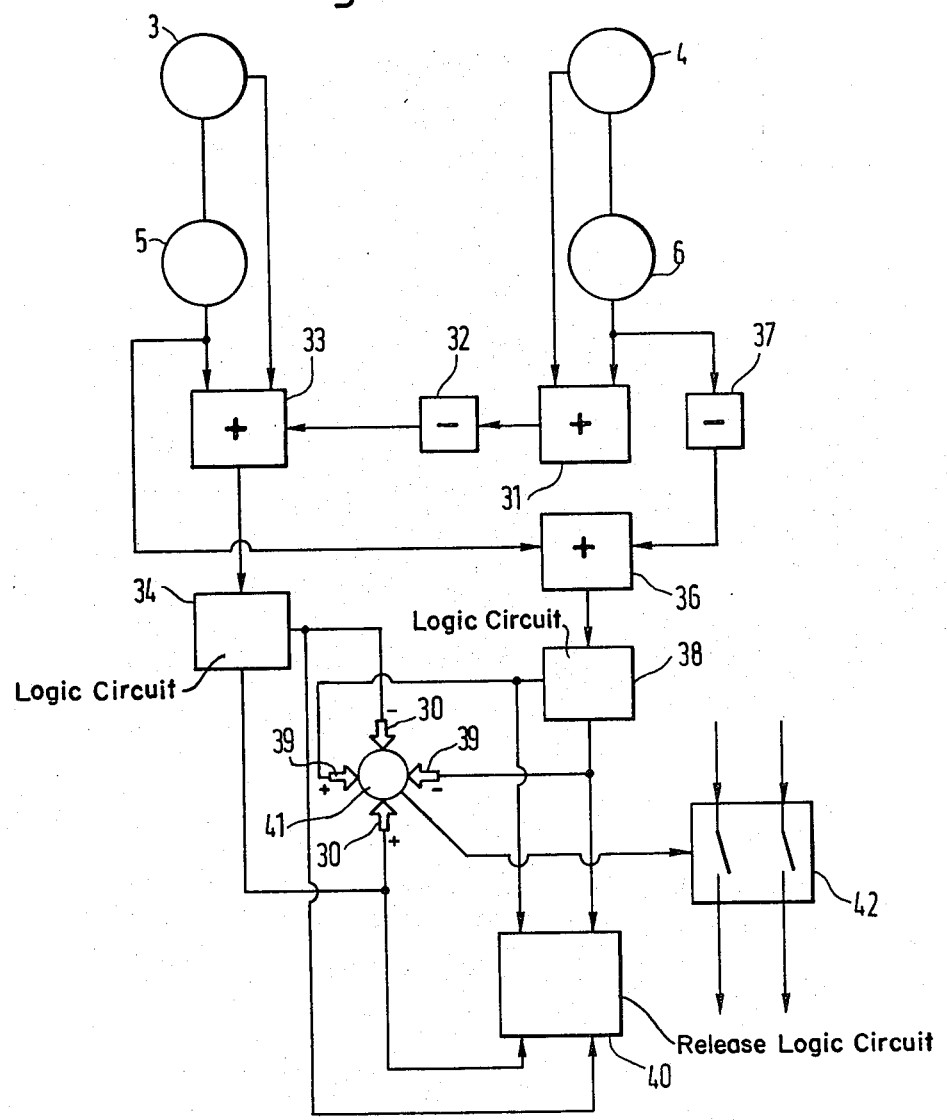
FIG. 5 is a block circuit diagram of the circuit arrangement of the wheel alignment measuring apparatus.

In order to enable the measuring bridge 10 to be correctly adjusted the signals released by the angle pick-ups 3, 4, 5 and 6 of the measuring bridge 10 are evaluated in a calculation circuit (cf. FIG. 5). Four arrows 30, 39 (cf. FIGS. 4, 5) which are mounted in one of the measuring heads 12 or 13 indicate the direction in which the measuring bridge 10 must be moved for an exact adjustment. The lighting-up of a release lamp 41 (cf. FIG. 5) confirms the correct adjustment of the measuring bridge 10. This release signal can be used to close a switch 42 so that power is supplied to the calculation unit, which results in the release of the measuring program provided by the calculation circuit. This prevents the measurement from being started before the measuring bridge 10 has reached its correct position.

The measuring bridge 10 is provided with wheels 15 of easy motion. After the measuring bridge 10 has been brought into the correct position it is essentially fixed by lowering a blocking device 20. The blocking device 20 can be manually actuated by means of a lever 22 or by a magnetic system which is controlled by a release logic 40 which can be triggered by the arrow 30, 39.

Between the measuring bridge 10 and the blocking device 20 an adjusting device (not shown) is provided which allows fine adjustment of the longitudinal axis of the measuring bridge 10 at right angles to the longitudinal axis of the vehicle. The adjusting device can be provided with an adjusting screw in the connection between the measuring bridge and the blocking device which acts in a direction parallel to the longitudinal axis of the vehicle so that the measuring bridge 10 can be slightly moved relative to the blocking device.

The aligned measuring bridge 10 provides a basis for the measurement of the angular position of the wheels with respect to each other due to the resulting angular positions of the eight angle pick-ups 1 to 8 influencing each other. Without any calculation, manipulation or change of sides of an operator the following values are automatically calculated in the calculation circuit. Said values can then be recalled from indicating devices: complete track of the front wheels, individual track of the front wheels with respect to the geometrical driving axis or to the the axis of symmetry, complete track of the rear wheels, individual track of the rear wheels with respect to the axis of symmetry and the geometrical driving axis.

The measuring bridge 10 itself consists of a transverse support 11, on each side of which the measuring head 12 or 13 is mounted, with the two angle pick-ups 3 and 5 and 4 and 6, respectively, being built in.

The transverse support 11 is mounted at a low position so that it can be moved under a vehicle to be measured. It must, however, be sufficiently stable so that it cannot sag in the horizontal position. The length of the measuring bridge 10 must be large enough to ensure a position of the measuring heads 12 and 13 outside the width of the vehicle.

On both sides of the transverse support 11 are receiving plates 16 for the measuring heads 12 and 13 (cf. FIG. 3B). In order to ensure an exact position of the measuring heads 12 and 13 these receiving plates 16 and the bottom surface 19 of the measuring heads 12 and 13 are provided with engaging centering and tensioning devices 17 and 18 having a conventional design.

The transverse support 11 is on both sides provided with wheels 15 which thus allow the measuring bridge 10 to be easily moved during the adjustment process. The one side of the measuring bridge 10 is preferably provided with swivelling wheels, whereas the other side is provided with wheels whose axle is transverse to the measuring bridge 10.

In order to prevent the measuring bridge 10 from moving after it has been set up, blocking devices 20 are provided at both sides of the measuring bridge 10. These blocking devices 20 slightly raise the measuring bridge 10. The parts facing the floor are coated with a material 21 providing the largest possible coefficient of friction.

Outside the width of the vehicle the measuring heads 12 and 13 are mounted on the transverse support 11. In each of these measuring heads rotary potentiometers are preferably built in for the two angle pick-ups 3 and 5 and 4 and 6, respectively, with tension arms 9 being mounted at the pivots of said rotary potentiometers. As has already been mentioned, an angle pick-up 3 and 4 is facing each front wheel, while the two other angle pick-ups 5 and 6 are assigned to the rear wheels. The centers of rotation of the angle pick-ups 3 to 6 can be located one above the other or side by side, when seen in a longitudinal or transverse direction. These four angle pick-ups 3 to 6 of the measuring bridge 10 indicate "0" as an output signal when the tension arms 9 are at right angles to the measuring bridge 10. The angle pick-ups 1-3, 2-4, 5-7 and 6-8, respectively, communicate with each other.

The level of the position of the measuring heads 12 and 13 is determined by the requirement that the tension elements 14 should have an approximately horizontal position.

In one of the measuring heads 12 and 13, preferably in the left measuring head 12, the electronic circuit, four direction indicating arrows 30 and 39 and a release lamp 41 are accommodated.

As has already been mentioned, the calculation of the wheel alignment of a vehicle, requires the measuring bridge 10 to be at right angles to the longitudinal axis or the axis of symmetry of the vehicle. The accuracy of the measurement is further increased if the two measuring heads 12 and 13 have the same distance from the center line of the vehicle.

It is assumed that the operator is on the left side of the vehicle during the measuring process, thus on the side where the steering system is accommodated.

In order to allow the measuring bridge 10 to be aligned the four arrows 30 and 39 indicate the direction in which the measuring bridge 10 must be moved in order to ensure an exact adjustment. Two of the four arrows 30 run parallel to the longitudinal axis or the axis of symmetry of the vehicle, thus transverse to the measuring bridge 10; the two other arrows 39 are transverse to the driving direction, thus parallel to the measuring bridge 10. The relase lamp 49 which is located between the arrows 30 and 39 indicates when the measuring bridge 10 is in the correct position.

The alignment movement can start when the measuring bridge heads 12 and 13 are mounted and the tension elements 14 between the angle pick-ups 3 and 6 of the measuring bridge 10 and the angle pick-ups 1, 2, 7 and 8 at the front and rear wheels are tightened.

The alignment movement itself is made in two sequences of operation. In one sequence of operation the measuring bridge 10 is brought at right angles to the axis of symmetry, in the other sequence of operation the measuring bridge 10 is moved transverse to the driving direction, until the two measuring heads 12 and 13 have the same distance from the center line of the vehicle.

Since the measuring bridge 10 will probably not be exactly in the required position with respect to the axis of symmetry of the vehicle after having been put into operation, two arrows will light up, i.e. one of the arrows 30 pointing in driving direction and one of the transverse arrows 39.

In the electronic circuit which serves the alignment of the measuring bridge 10 and controls the arrows 30, 39 only the output values of the angle pick-ups 3 to 6 of the measuring bridge 10 are processed. The output values of the angle pick-ups 1, 2, 7 and 8 mounted at the wheels are hereby neglected.

In order to control the arrows 30 pointing in the driving direction the output values of the two angle pick-ups 3 and 5 of the left measuring head 12 and the output values of the angle pick-ups 4 and 6 of the right measuring head 13 combined in an adder 31 are added up in an adder 33 after having been inverted in an inverter 32 and fed into an arrow logic 34. The arrow logic 34 controls the arrows 30 in such a way that the arrow 30 pointing to the front will light up as soon as a positive value has been fed into said arrow logic. In the case of a negative value the arrow 30 pointing to the rear will light up.

The movement of the measuring bridge 10 in the indicated direction is made only with the left side, i.e. with the measuring head 12. On the right side a movement of the measuring bridge in the longitudinal direction of the vehicle is blocked by means of the wheels 15, and thus the measuring head 13 only makes a rotary movement. Thus, the values of the angles at the pick-ups 3 and 5 and the values of the angles at the pick-ups 4 and 6 change in the same magnitude, but in an opposing manner, until a value "0" is fed into the logic 34. In this case the logic 34 interrupts the power supply to the two arrows 30. In order to control the two arrows 39 which are transverse to the driving direction the output values of the angle pick-ups 5 and 6 are added up in an adder 36 after the output value of the angle pick-up 6 has been inverted in an inverter 37. The adder 36 is connected behind a logic 38 which supplies power to the arrow 39 pointing towards the middle of the vehicle when a positive value has been fed to said adder, and which supplies power to the arrow 39 pointing away from the vehicle when a negative value has been fed to said adder.

By means of moving the measuring bridge 10 in the indicated direction, thus at right angles to the axis of symmetry of the vehicle, the output values of the angle pick-ups 5 and 6 change in an opposing manner until a synchronization has been reached and a "0"-value is supplied to the logic 38. The logic 38 then interrupts the power supply to the two arrows 39.

After the measuring bridge 10 has been set up, and when none of the four arrows 30 and 39 is excited, the logic 40 which is connected to the four feed lines of the arrows 30 and 39 releases a signal which puts the release lamp 41 into operation and also closes the switch 42.

Closing of the switch 42 puts the electronic circuit into operation where the track values are calculated. Thus it is ensured that the track measurement values are not indicated until the measuring bridge 10 has been brought into the correct position.

Figure 6:
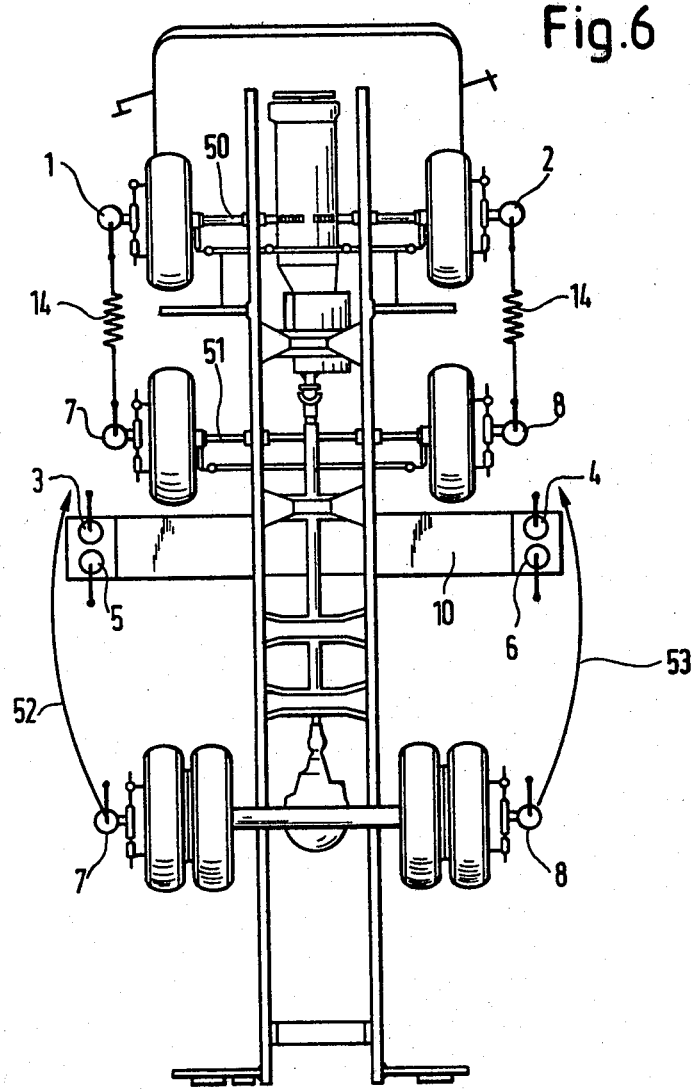
FIGS. 6 and 7 illustrate the application of the wheel alignment measuring apparatus in the measurement of two steered front axles.

In the case of a vehicle with two steered front axles two different measuring methods can be applied for the angular position of the wheels with respect to each other. In the case of the first measuring method (cf. FIG. 6) a direct comparison is made between the wheels of the first front axle 50 and the equally sided wheels of the second front axle 51.

The angle pick-ups 7 and 8 which are mounted at the rear wheels are mounted on the wheels of a second front axle 51 without changing the side (cf. arrows 52, 53). By means of the elastic tension elements 14 the angle pick-ups 1 and 7 as well as well as 2 and 8 are connected in such a way that they influence each other and in an opposing manner.

Figure 7:
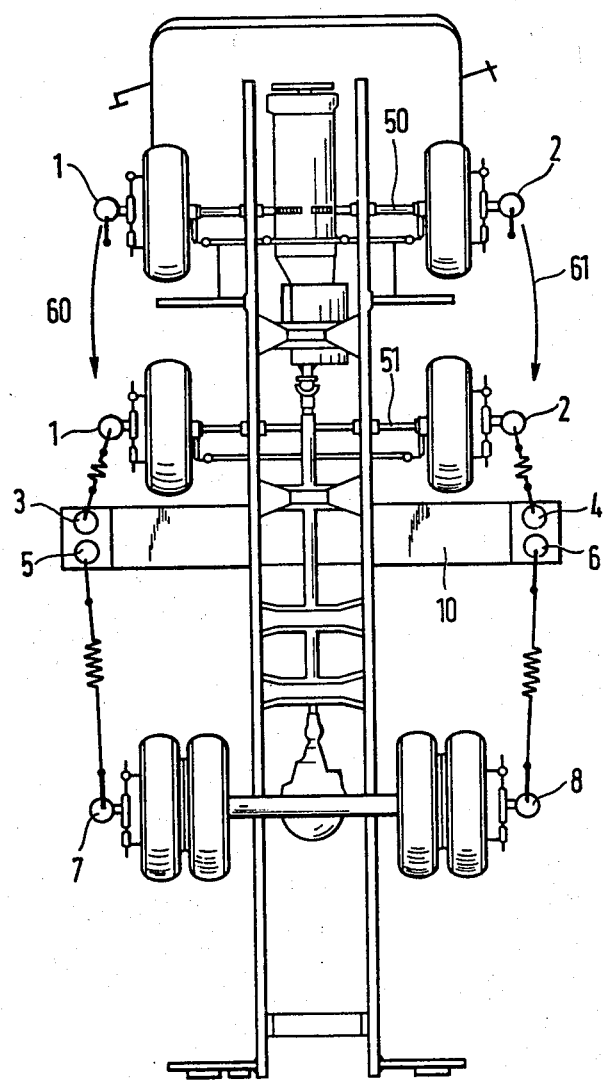

A track difference between the first and the second front axle 50 and 51 is eliminated in the calculation circuit and will not be included in the measurement result. The required values are calculated in a separate circuit and are recalled via a switch which is integrated into a switch group. The synchronisation of or the difference between one wheel of the first front axle 50 and the equally-sided wheel of the second front axle 51 is, however, indicated at the same time for each side separately. The angle pick-ups are connected in such a way that a larger toe-in of a wheel of the second axle 51 is indicated by means of a plus sign. For each side the ideal condition would be "+/−0". This measuring method has the enormous advantage that the change of the values can be observed during the process of setting up. In the case of the second measurement method (cf. FIG. 7) the angular positions of the wheels of both axles (50, 51) are determined separately, but on the same basis of measurement, i.e. the measuring bridge. The angle pick-ups 1 and 2 are mounted at the wheels of the second front axle 51 (cf. arrows 60, 61) without changing the side, and the connection with the corresponding angle pick-ups 3 and 4 of the measuring bridge 10 is obtained by means of the elastic tension elements 14. After the position of the measuring bridge 10 has been controlled the measurement results can then be recalled.

A comparison with the values resulting from the measurement of the first front axle 50 will provide information on the state of the steering geometry of the four front wheels with respect to each other.

The arrangement of the angle pick-ups 1 to 8, their polarity and their mutual interference provide the basis for the calculation of the angular positions of the vehicle wheels with respect to each other. The output values of the angle pick-ups 1 to 8 are processed in accordance with the following table, with the listed figures indicating the individual angle pick-ups in accordance with FIG. 1 and the calculation operations being schematically indicated in FIGS. 8 to 15.

TABLE

| Measured Value | Output value of angle pick-up | Reference FIG. |
|---|---|---|
| Total track of the front wheels | $1 + 2 + 3 + 4$ | FIG. 8 |
| Total track of the rear wheels | $5 + 6 + 7 + 8$ | FIG. 9 |
| Geometrical driving | $\frac{5 + 7 - 6 - 8}{2}$ | FIG. 10 |
| Individual track, to the front, left | $1 + 3 + \frac{6 + 8 - 5 - 7}{2}$ | FIG. 11 |
| Individual track, to the front, right | $2 + 4 + \frac{5 + 7 - 6 - 8}{2}$ | FIG. 12 |
| Individual track, to the rear, left | $5 + 7$ | FIG. 13 |
| Individual track, to the rear, right | $6 + 8$ | FIG. 13 |
| Steering difference angle, left | $1 + 3$ | FIG. 14 |
| Steering difference angle, right | $2 + 4$ | FIG. 14 |
| In the case of a double front axle: | | |
| Left-side comparison | $7 - 1$ | FIG. 15 |
| Right-side comparison | $8 - 2$ | FIG. 15 |

I claim:

1. A wheel alignment measuring apparatus including four angle measuring instruments for mounting on front wheels and rear wheels of a vehicle, and including a calculation circuit for the determination of track measuring values comprising:
   a measuring bridge being operatively provided essentially transversely to the driving direction and being positioned approximately between the front wheels and the rear wheels;
   four additional angle measuring instruments, two being operatively arranged on one side and two being operatively arranged on the other side of the measuring bridge;
   elastic tension means being operatively connected between said four angle measuring instruments and said four additional angle measuring instruments for measuring the angle positions of the wheels;
   said calculation circuit determining the track measuring values from comparing angular positions of all angle measuring instruments.

2. An apparatus in accordance with claim 1, wherein the four additional angle measuring instruments of the measuring bridge are built into two measuring heads being removable mounted and adjustable with respect to the measuring bridge.

3. An apparatus in accordance with claim 2, wherein the measuring bridge comprises a transverse support being mounted at a low position so that the measuring bridge can be moved under a vehicle to be measured.

4. An apparatus in accordance with claim 3, wherein the transverse support is provided with receiving plates for measuring heads.

5. An apparatus in accordance with claim 1, wherein the angle measuring instruments are arranged and connected wherein influences resulting from the track of the vehicle wheels and the width of the measuring bridge as well as differences in the distance between the measuring bridge and the front wheels or the rear wheels are not reflected by the result of the measurement.

6. An apparatus in accordance with claim 1, wherein each of the angle measuring instruments is provided with an electric angle pick-up being directly connectable to the calculation circuit.

7. An apparatus in accordance with claim 2, wherein the calculation circuit is connected with the four additional angle measuring instruments of the measuring bridge and controls four indicating arrows and a lamp in one or in both measuring heads.

8. An apparatus in accordance with claim 1, wherein the measuring bridge is provided on both sides with a blocking device.

9. An apparatus in accordance with claim 8, wherein one of the blocking devices is rotatably mounted opposite the measuring bridge.

10. An apparatus in accordance with claim 8, wherein the blocking devices are coated with a layer of a high adhesion at their sides facing the ground.

11. An apparatus in accordance with claim 8, wherein the blocking devices can be actuated by means of a hand lever.

12. An apparatus in accordance with claim 8, wherein the blocking devices are actuated by means of magnets which are controlled by the calculation circuit.

13. An apparatus in accordance with claim 1, wherein the circuit arrangement connected with the individual angle measuring instruments, includes an inverter and a logic element operatively connected thereto.

14. An apparatus in accordance with claim 1, wherein the measuring bridge comprises a transverse support being mounted at a low position so that the measuring bridge can be moved under a vehicle to be measured.

15. An apparatus in accordance with claim 14, and further including measuring heads and receiving plates operatively mounted on said transverse support.

16. An apparatus in accordance with claim 15, wherein the receiving plates and the measuring heads are each provided with engaging centering and tensioning devices.

17. An apparatus in accordance with claim 14, wherein the transverse support is on both sides provided with wheels.

18. An apparatus in accordance with claim 8, wherein an adjusting device is provided between the blocking device and the measuring bridge, said adjusting device allowing fine adjustment of the longitudinal axis of the measuring bridge at right angles to the longitudinal axis of the vehicle.

19. An apparatus in accordance with claim 18, wherein the adjusting device is provided with an adjusting screw in the connection between the measuring bridge and the blocking device, said adjusting device acting in a direction which is parallel to the vehicle axis so that the measuring bridge can be moved relative to the blocking device.

* * * * *